(12) United States Patent
Milde, Jr.

(10) Patent No.: US 8,561,935 B2
(45) Date of Patent: Oct. 22, 2013

(54) STOL AND/OR VTOL AIRCRAFT

(76) Inventor: Karl F. Milde, Jr., Mahopac, NY (US)

( * ) Notice: Subject to any disclaimer, the term of this patent is extended or adjusted under 35 U.S.C. 154(b) by 276 days.

(21) Appl. No.: 12/951,146

(22) Filed: Nov. 22, 2010

(65) Prior Publication Data

US 2012/0068020 A1    Mar. 22, 2012

Related U.S. Application Data

(60) Provisional application No. 61/403,581, filed on Sep. 17, 2010.

(51) Int. Cl.
*B64C 39/00* (2006.01)
*B64C 21/04* (2006.01)

(52) U.S. Cl.
USPC ............................... 244/9; 244/207

(58) Field of Classification Search
USPC ......... 244/207, 45 R, 23 R, 23 D, 12.1, 9, 10, 244/19, 21, 1 R
See application file for complete search history.

(56) References Cited

U.S. PATENT DOCUMENTS

| | | | |
|---|---|---|---|
| 2,270,920 A | | 1/1942 | Backhaus |
| 2,344,515 A | * | 3/1944 | Massey ............................ 244/10 |
| 2,437,684 A | | 3/1948 | Custer |
| 2,510,959 A | | 6/1950 | Custer |
| 2,523,938 A | | 9/1950 | Berliner |
| 2,532,482 A | | 12/1950 | Custer |
| 2,611,555 A | | 9/1952 | Custer |
| 2,691,494 A | | 10/1954 | Custer |
| 2,885,160 A | * | 5/1959 | Griswold, II ................. 244/207 |
| 3,065,928 A | * | 11/1962 | Dornier ........................... 244/10 |
| 3,082,976 A | * | 3/1963 | Dornier ...................... 244/12.1 |
| 3,123,321 A | | 3/1964 | Custer |
| 3,178,131 A | * | 4/1965 | Laing ............................. 244/15 |
| 3,314,629 A | | 4/1967 | Rethorst |
| 3,612,444 A | | 10/1971 | Girard |
| 3,705,700 A | | 12/1972 | Custer |

(Continued)

FOREIGN PATENT DOCUMENTS

| | | |
|---|---|---|
| GB | 865524 | 4/1961 |
| GB | 885663 | 12/1961 |
| GB | 1085459 | 10/1967 |
| WO | 2007049032 A1 | 5/2007 |

OTHER PUBLICATIONS

"Flapless Aircraft Steered by Air Bursts", Discovery News.com, Nov. 10, 2010.
"Demon UAV Flies Without Flaps", www.gizmag.com.

*Primary Examiner* — Joseph W Sanderson
*Assistant Examiner* — George Andonyan
(74) *Attorney, Agent, or Firm* — Karl F. Milde, Jr.

(57) ABSTRACT

An STOL and/or VTOL aircraft comprises (1) a fuselage having a front end, a rear end and two lateral sides, the fuselage defining a substantially horizontal central longitudinal axis of the aircraft; (2) an aircraft tail arranged at the rear end of the fuselage and including a rudder and an elevator on each side of the fuselage with movable surfaces for controlling the aircraft; and (3) a wing on each side of the fuselage having a front edge, a trailing edge and an upper surface extending from the front edge to the trailing edge. A device for controlling the airflow over the upper surfaces of the wings comprises openings in these upper surfaces for the egress of air from interior spaces within the wings and air pump apparatus for pressurizing such interior spaces.

18 Claims, 5 Drawing Sheets

(56) References Cited

U.S. PATENT DOCUMENTS

| | | | |
|---|---|---|---|
| 3,770,227 A | 11/1973 | Von Ohain et al. | |
| 3,873,233 A * | 3/1975 | Linck | 416/90 R |
| 4,117,995 A | 10/1978 | Runge | |
| 4,848,701 A * | 7/1989 | Belloso | 244/12.5 |
| 5,749,337 A | 5/1998 | Palatov | |
| 5,988,522 A * | 11/1999 | Glezer et al. | 239/11 |
| 6,016,992 A * | 1/2000 | Kolacny | 244/12.6 |
| 6,073,881 A * | 6/2000 | Chen | 244/23 C |
| 6,079,671 A * | 6/2000 | O'Neil et al. | 244/204 |
| 6,109,565 A * | 8/2000 | King, Sr. | 244/207 |
| 6,732,972 B2 | 5/2004 | Malvestuto, Jr. | |
| 7,290,738 B1 * | 11/2007 | Rogers et al. | 244/207 |
| 7,461,811 B2 | 12/2008 | Milde, Jr. | |
| 7,568,657 B2 * | 8/2009 | Milde, Jr. | 244/55 |
| 7,607,606 B2 * | 10/2009 | Milde, Jr. | 244/9 |
| 7,654,486 B2 | 2/2010 | Milde, Jr. | |
| 2005/0205715 A1 | 9/2005 | Hansen | |
| 2006/0022092 A1 * | 2/2006 | Miller et al. | 244/200.1 |
| 2006/0054736 A1 * | 3/2006 | Milde, Jr. | 244/9 |
| 2006/0266882 A1 * | 11/2006 | Kummer et al. | 244/55 |
| 2007/0034746 A1 * | 2/2007 | Shmilovich et al. | 244/207 |
| 2009/0218438 A1 * | 9/2009 | Milde, Jr. | 244/9 |
| 2010/0226749 A1 | 9/2010 | Gammack et al. | |
| 2012/0111994 A1 * | 5/2012 | Kummer et al. | 244/15 |

* cited by examiner

STOL AND/OR VTOL AIRCRAFT

CROSS-REFERENCE TO RELATED APPLICATION

This application claims priority from the Provisional Application No. 61/403,581 filed Sep. 17, 2010.

BACKGROUND OF THE INVENTION

The present invention relates to short take-off and landing (STOL) and/or vertical take-off and landing (VTOL) aircraft.

The present invention further relates to aircraft of the conventional type; that is, an aircraft having a central, longitudinally extending fuselage; an aircraft tail, including a rudder and elevator arranged at the rear end of the fuselage, for controlling the aircraft; and at least one wing arranged on each side of the fuselage for providing lift, due to the different speeds of the airstreams flowing over the upper surface and the lower surface, respectively, of the wing.

More specifically, the present invention is related to an winged aircraft of the conventional type, as described above, which includes some means for increasing the speed of the airstream flowing over the upper surface of each wing as compared to the speed of the airstream flowing over the lower surface of the wing. Such an increase in the speed of the airstream results in increased lift due to the well-known Bernoulli's Principle.

Various means and devices have been developed in the art for increasing the speed of the air that flows over the upper surface of an aircraft wing. A number of such devices are disclosed in the U.S. Pat. Nos. 7,461,811; 7,568,657; 7,607,606 and 7,654,486 to Karl Milde, Jr. Other such devices were developed by Willard R. Custer over a period of many years, culminating in an FAA-certified aircraft known as the "CCW-5 Custer Channel Wing Aircraft". Elements of the design of the Custer Channel Wing Aircraft are disclosed in the following U.S. Pat. Nos.: 2,437,684; 2,510,959; 2,532,482; 2,611,555; 2,691,494; 3,123,321 and 3,705,700.

Finally, it is known to inject air under pressure out of openings in either the leading edge, the trailing edge, or both, of an aircraft wing both to augment lift and to add a forward component of force. Such aircraft designs are taught in the U.S. Pat. Nos. 2,270,920; 2,523,938 and, most particularly, U.S. Pat. No. 4,117,995.

All of the aforementioned patent references, as well as the U.S. patent publication No. US 2010/0226749 A1, are incorporated herein by reference.

SUMMARY OF THE INVENTION

It is a principal object of the present invention to provide a short take-off and landing (STOL) and/or a vertical take-off and landing (VTOL) aircraft of the conventional type having a central fuselage, wings on either side which create lift and a tail which adds stability and/or control.

It is a further object of the present invention to provide a winged aircraft of the type described above which is capable of flying at low speeds in relatively thin air and high altitudes.

It is a further object of the present invention to provide a winged aircraft of the type described above which includes means for increasing the speed of the air flowing over the upper surface of each wing.

It is a further object of the present invention to provide a winged aircraft of the type described above that has means for injecting air out of openings in the aircraft wings in such a way as to control at least one of the roll, pitch and yaw of the aircraft.

These objects, as well as further objects which will become apparent from the discussion that follows, are achieved, in accordance with the present invention, by providing air openings in the material forming the upper and/or lower wing surfaces, for the passage of air from an interior space within the wing to an exterior surface thereof in a region between the leading and trailing edges of the wing, and providing an air blower or other device for pressurizing such interior space.

The above objects are further achieved, in accordance with the present invention, by providing at least one blower device in each wing which comprises:

(1) a shaft mounted for rotation in the respective wing and extending substantially parallel to a longitudinal wing axis thereof; and (2) a plurality of fan blades attached to the shaft for movement of air in the rearward direction.

According to a preferred feature of the invention, the air pressure within each wing and/or the blower device on each wing are independently controllable so as to independently control the lift generated by the respective wing.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-9 of the drawings. Identical elements in the various figures are designated with the same reference numerals.

Figure 1:
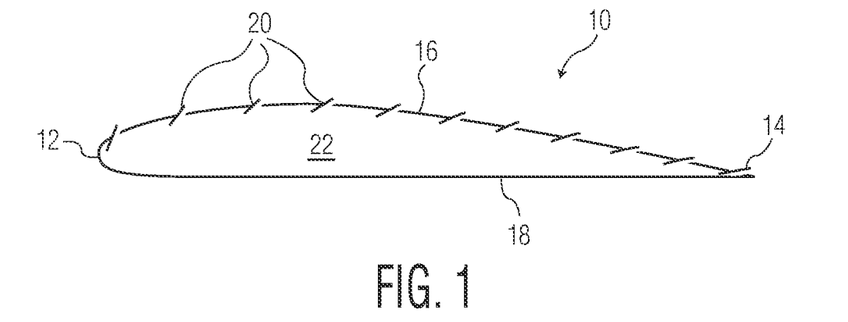
FIG. 1 is a representational diagram of an aircraft wing, shown in cross section, incorporating openings in the upper surface thereof according to the present invention.

FIG. 1 shows an aircraft wing 10 in profile having a leading edge 12, a trailing edge 14, an upper surface 16 and a lower surface 18. The material forming the upper surface is provided with openings 20 for the egress of air from an interior space 22 of the wing 10. The interior space or spaces within the wing are pressurized to force air out through the openings 20.

The interior spaces may comprise the entire interior of the wing (with the exception of the internal wing structure, gas tanks, etc.) or the spaces may be formed of tubing, slots or the like arranged just beneath the material forming the upper surface of the wing.

Figure 2:
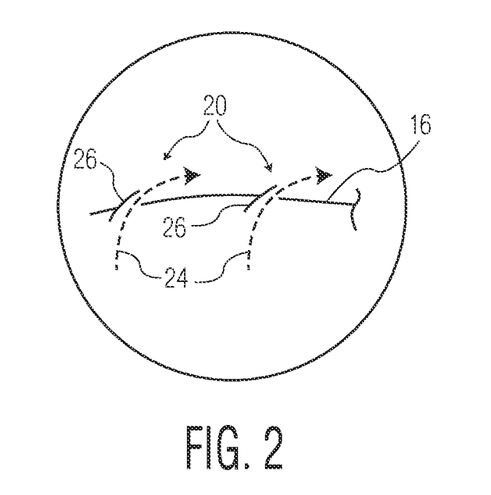
FIG. 2 is a detailed view of the wing of FIG. 1 showing two of the openings.

The openings 20 are designed to direct air over the upper surface so that it flows toward the trailing edge 14 of the wing. As shown in FIG. 2, the air 24, indicated in dashed lines, is directed rearward via louvers 26 disposed on the forward edges (the edges closest to the leading edge 12 of the wing) of the openings. These louvers may be rigidly attached to the material forming the upper surface, or they may be designed to open and close the openings, as required during operation of the aircraft. For example, they may be spring loaded and biased toward the wing surface in such a way that they open when the air pressure in the interior of the wing is sufficiently greater than the exterior pressure.

The airflow of air from the openings 20, which is similar in principle to that disclosed in the U.S. Patent Publication No, 2010/0226749 to Gammack and Dyson, draws other air above the upper surface and moves it toward the trailing edge. The openings emit air over a so-called "Coanda surface," i.e., a surface over which fluid, exiting an orifice close to this surface, exhibits the "Coanda effect" whereby the fluid tends to flow over the Coanda surface closely, seemingly "clinging to" or "hugging" this surface. The air emitted from the openings 20 and passing over their respective Coanda surfaces, entrains other air, causing it also to flow over and hug the upper surface of the wing.

Figure 3:
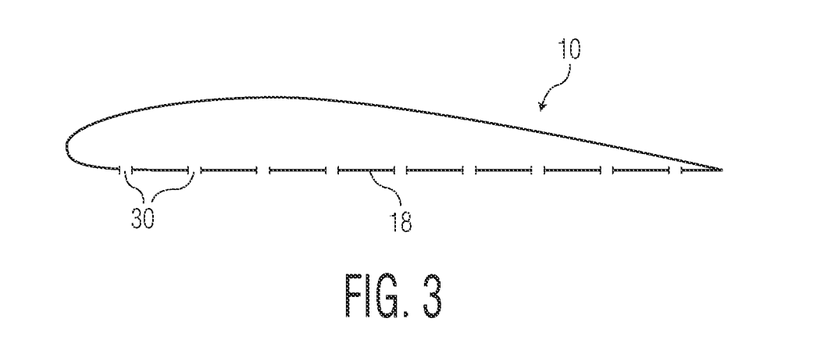
FIG. 3 is a representational diagram of an aircraft wing, shown in cross section, incorporating openings in the lower surface thereof according to the present invention.
Figure 4:
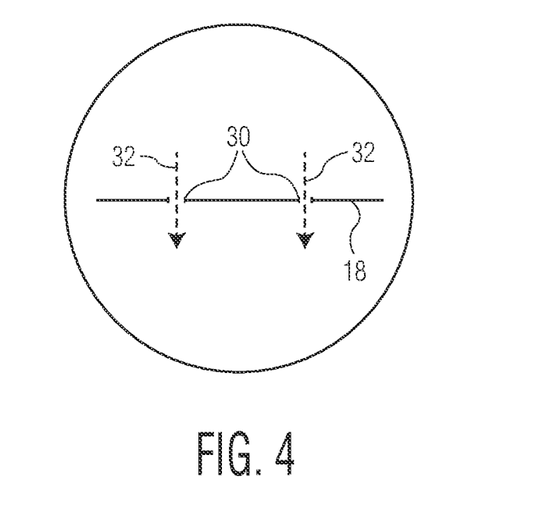
FIG. 4 is a detailed view of the wing of FIG. 3 showing two of the openings.

FIG. 3 shows a wing 10 with openings 30 in the material forming the lower surface thereof. As illustrated in FIG. 4, these openings allow pressurized air 32, indicated in dashed lines, to pass directly downward from the interior space or spaces within the wing through the lower surface 18 thereof, thus increasing the air pressure below the lower surface.

Figure 5:
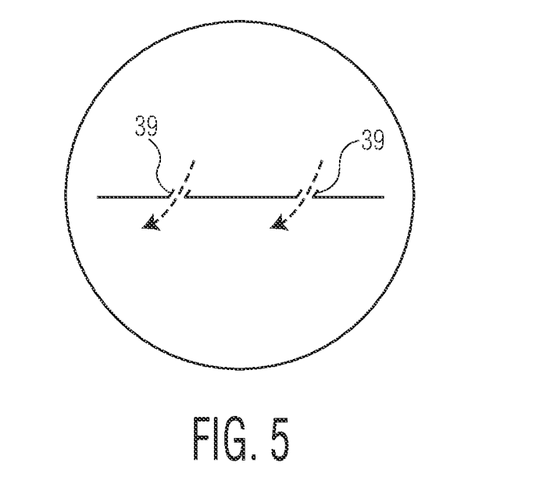
FIG. 5 is a detailed view of an alternative embodiment of the openings shown in FIG. 4.

If desired, louvers 39 may be provided as shown in FIG. 5 to direct air forward toward the leading edge of the wing, as shown in FIG. 5 to interrupt or reduce the rearward movement of air over the lower surface of the wing.

Figure 6:
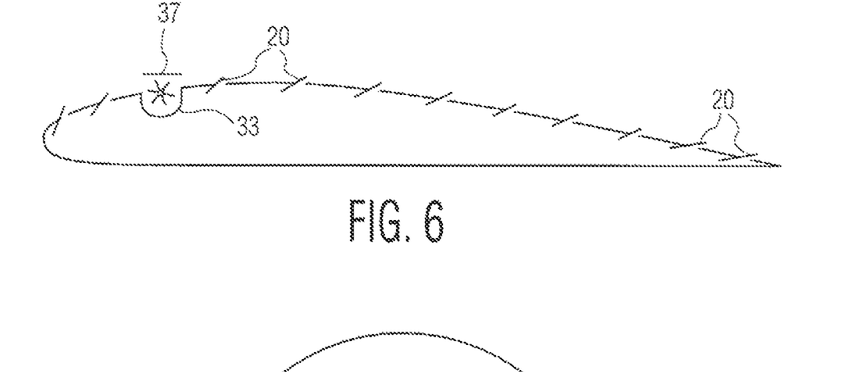
FIG. 6 is a representational diagram of an aircraft wing, shown in cross section, incorporating an air blower device for increasing the speed of air flowing over the upper surface of a wing, as well as openings for the egress of air from an interior space within the wing.
Figure 7:
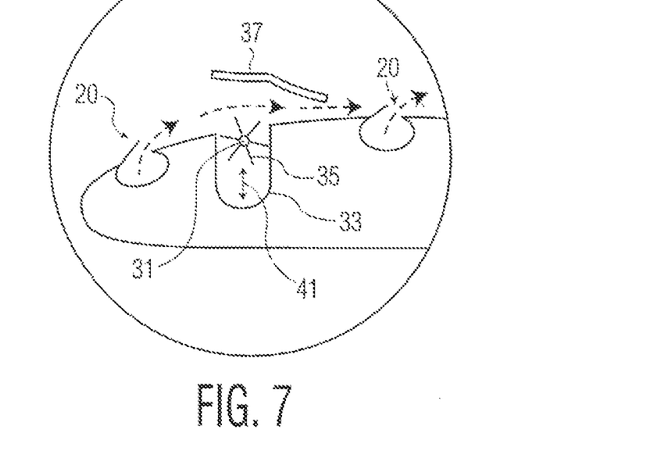
FIG. 7 is a detailed view of the wing of FIG. 6 showing the air blower device and two of the openings.

FIGS. 6 and 7 show an aircraft wing having an air blower comprising a rotatable shaft 31, disposed in a groove 33 in the wing, with attached fan blades 35. Preferably an air deflector or shroud 37 is mounted above the blades to constrain the direction of air movement. The shaft 31 and blades 35 are rotated in such a direction (clockwise as shown in the figure) that air is forced rearward in the direction of the trailing edge of the wing. This wing configuration is further shown and described in the U.S. Pat. Nos. 7,461,811; 7,568,657; 7,607,606 and 7,654,486 to Karl Milde, Jr. As indicated by the double arrow 41, the air blower device, comprised of the shaft 31 and fan blades 35, may be retracted into the groove 33, when not in use.

The shroud 37 may be retracted too, forming a smooth airfoil upper surface of the wing, or it may be left in place. Preferably, the shroud is provided with a curvature in cross section, as illustrated in FIG. 7, to form a nozzle that increases the velocity of the exiting air.

In addition, the aircraft wing is provided with openings 20 of the type shown in FIGS. 1 and 2. Air expelled from these openings serves to entrain the air blown by the fan blades 35 so that it flows smoothly rearward without turbulence, close to the upper surface of the wing 10.

Figure 7A:
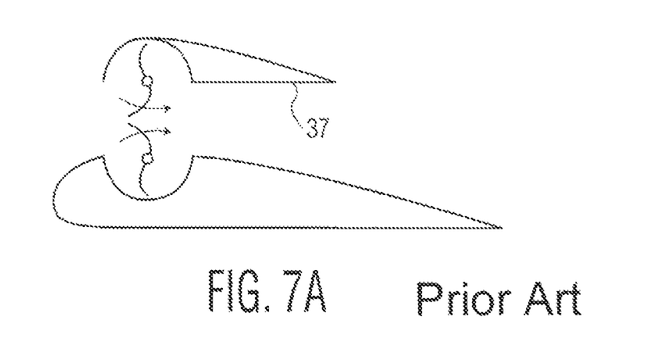
FIG. 7A is a detailed view of an alternative embodiment of the air blower device shown in FIG. 7.

As shown in FIG. 7A the air blower may comprise two shafts with associated fan blades, as shown and described in U.S. Pat. No. 7,568,657, referred to above. The upper shaft and blades, which rotate counterclockwise in this illustration, are surrounded by the shroud 37.

Figure 8:
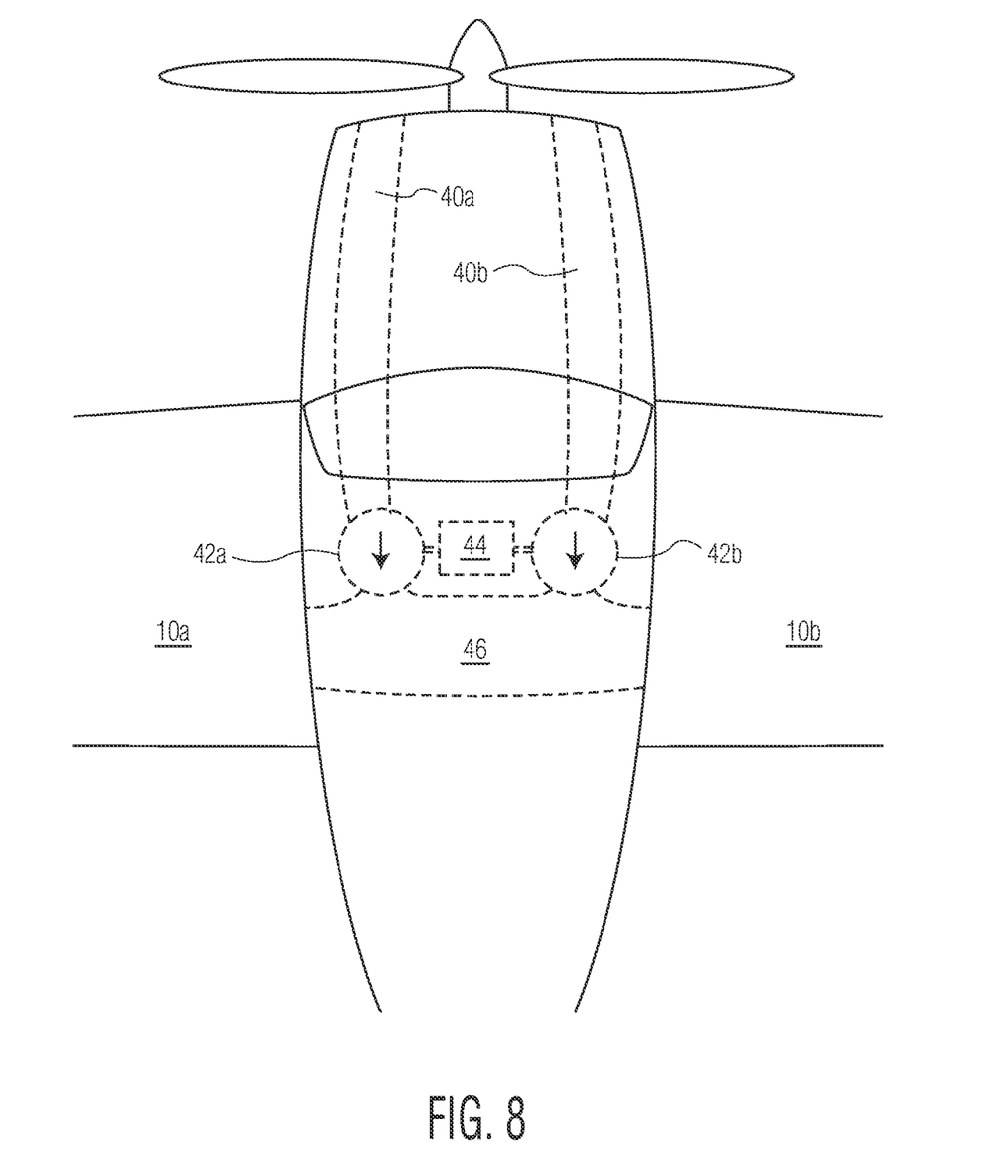
FIG. 8 is a top view of an aircraft having means for pressurizing interior spaces within the wings.

FIG. 8 shows an aircraft in top view. As indicated in phantom (dashed lines), ducts 40a and 40b are provided for the passage of air through the fuselage to blowers 42a and 42b, respectively, both of which may be driven by a common motor 44. In this embodiment, the blowers 42a and 42b direct air under pressure to a common manifold 46 from where it is directed to the interior spaces of the wings 10a and 10b on either side of the fuselage. The motor 44 may be powered electrically. Preferably, however, the motor and blowers are combined in a barrel-type internal combustion engine and compressor such as that taught in the U.S. Pat. No. 5,749,337.

Figure 9:
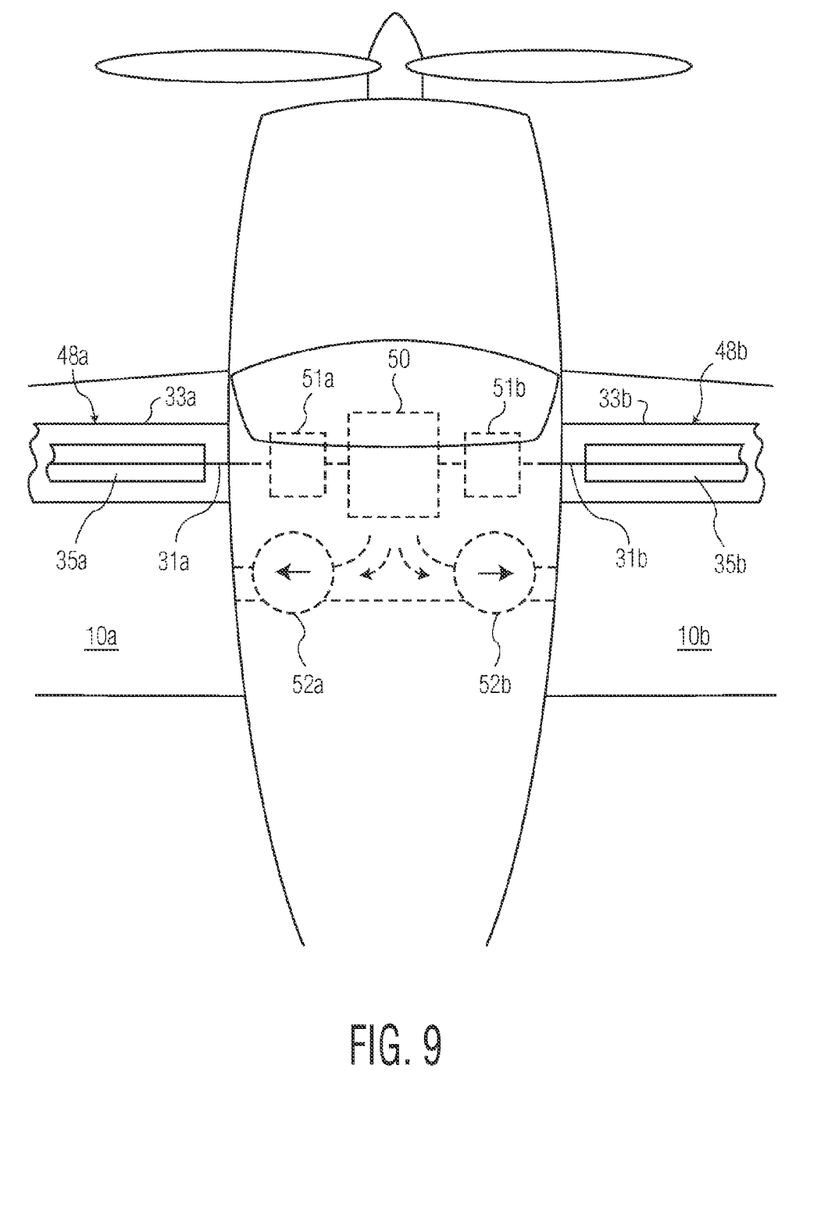
FIG. 9 is a top view of an aircraft having both an air blower device and means for pressurizing interior spaces within the wings.

FIG. 9 shows another embodiment of an aircraft, in top view, having a motor 50 with transmissions 51a and 51bfor independently driving the fans 48a and 48b, respectively. Separate blowers 52a and 52b for independently pressurizing the interior spaces of the wings 10aand 10b . By controlling the transmissions 51a and 51b and the blowers 52a and 52b it is possible to independently vary the lift on each wing 10a and 10b, thus controlling the aircraft.

There has thus been shown and described a novel STOL and/or VTOL aircraft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. For example, this invention may be incorporated into aircraft having other means for increasing the speed of the air flowing over the upper surface of the aircraft wings, such as the means disclosed in the U.S. patents referred to in the "Background of the Invention" section, above. All such changes, modifications, variations and other uses and applications which do not depart from the spirit and scope of the invention are deemed to be covered by the invention, which is to be limited only by the claims which follow.

What is claimed is:

1. An aircraft comprising, in combination:
   (a) a fuselage having a front end, a rear end and two lateral sides, said fuselage defining a substantially horizontal central longitudinal axis of the aircraft;
   (b) an aircraft tail arranged at the rear end of the fuselage and including a rudder and an elevator on each side of the fuselage, said rudder and elevator having movable surfaces for control of the aircraft;
   (c) a wing on each side of the fuselage, each wing having a leading edge, a trailing edge, an upper surface and a lower surface extending from the leading edge to the trailing edge thereof;
   (d) a first device for increasing the speed of the air stream flowing over the upper surface of each wing having at least one air blower disposed on each wing which includes:
      (1) at least one shaft mounted for rotation in the respective wing component and extending substantially parallel to said wing axis; and
      (2) a plurality of fan blades attached to each shaft and configured to cause movement of air over said upper surface in a direction toward the trailing edge of the respective wing component upon rotation of the respective shaft, at least a portion of said fan blades extending above said upper surface; and (e) a second device for controlling an air stream flowing over the upper surface of each wing, said device comprising:
  (1) a plurality of openings in the material forming the upper surface of the respective wing for the egress of air from at least one interior space within the respective wing to said upper surface thereof, said openings being disposed in said upper surface in a region between the leading edge and trailing edge of the wing and being configured to (i) emit air over an airflow surface formed by at least a portion of said upper surface, and (ii) entrain, with the emitted air, other air that moves over said upper surface; and
  (2) an air pump apparatus for pressurizing said at least one interior space within each wing in communication with said openings,
  wherein said openings are configured to direct airflow over the upper surface of each wing in a direction toward said trailing edges thereof and to entrain and control the flow of said other air that moves over said upper surface; and
  wherein at least a portion of said second device is arranged in said wing aft of said first device in the direction of flow of the air stream.

2. The aircraft recited in claim 1, further comprising openings in the material forming the lower surface of each wing for the egress of a from at least one interior space within the respective wing to said lower surface of said wing.

3. The aircraft defined in claim 1, wherein said air pump apparatus is operative to individually vary the pressure within said at least one interior space within each wing.

4. The aircraft defined in claim 1, wherein the fan blades are elongate and extend substantially parallel to the shaft to which they are attached.

5. The aircraft defined in claim 1, further comprising a shroud in each wing, disposed adjacent and above said fan blades, which directs the air rearward, thereby increasing the vertical lift of said aircraft wing.

6. The aircraft defined in claim 5, wherein at least a portion of said shroud is movable in the vertical direction.

7. The aircraft defined in claim 1, wherein the airspeed increasing device comprises two shafts mounted for rotation in each wing, said two shafts extending substantially in parallel to said wing axis and to each other, each of said two shafts being driven by a common prime mover and having a plurality of fan blades attached thereto for movement of air.

8. The aircraft definedis claim 7, wherein said two shafts mounted in each wing are driven in counter rotation by said prime mover.

9. The aircraft defined in claim 8, wherein said two shafts mounted sufficiently close together such that their respective fan blades are interleaved.

10. The aircraft defined in claim 9, wherein the fan blades are configured to inhibit air from passing between said two shafts, thereby forming a Roots-type blower configuration.

11. The aircraft defined in claim 8, wherein said two shafts are mounted sufficiently far apart such that their respective fan blades are not interleaved.

12. The aircraft defined in claim 11, wherein said two shafts are driven in counter rotation by said prime mover in a direction causing air to be directed rearward between said two shafts.

13. A personal aircraft (PAC) capable of short take-off and landing (STOL) or vertical take-off and landing (VTOL) and having a center of gravity, said aircraft comprising, in combination:
  (a) an elongate fuselage having two lateral sides and forming a passenger compartment, said fuselage being arranged along a longitudinal axis of said aircraft;
  (b) an elongate fixed wing having a leading edge and a trailing edge and a longitudinal wing axis between them, said fixed wing being attached to the fuselage and extending outward from the two lateral sides thereof with the wing axis substantially perpendicular to said longitudinal axis of said aircraft, the center of gravity of said aircraft being located in a region between the leading edge and the trailing edge of said wing, said wing having a first wing component extending outward from one lateral side of said fuselage and second wing component extending outward from an opposite lateral side of said fuselage, each said wing component having an upper surface;
  (c) a first device disposed on each wing component for increasing the speed of an air stream flowing over the upper surface of the respective wing component as compared to the speed of an air stream flowing over the lower surface thereof, said air speed increasing device comprising:
    (1) at least one shaft mounted for rotation in the respective wing component and extending substantially parallel to said wing axis; and
    (2) a plurality of fan blades attached to each shaft and configured to cause movement of air over said upper surface in a direction toward the trailing edge of the respective wing component upon rotation of the respective shaft, at least a portion of said fan blades extending above said upper surface; and
  (d) a second device for controlling an air stream flowing over the upper surface of each wing component, said device comprising:
    (1) a plurality of openings in the material forming the upper surface of the respective wing component for the egress of air from at least one interior space within the respective wing component to said upper surface thereof, said openings being disposed in said upper surface in a region between the leading edge and trailing edge of the respective wing component and being configured to (i) emit air over an airflow surface formed by at least a portion of said upper surface, and (ii) entrain, with the emitted air, other air that moves over said upper surface; and
    (2) an air pump apparatus for pressurizing said at least one interior space within each wing component in communication with said openings,
    wherein said openings are configured to direct airflow over the upper surface of each wing component in a direction toward said trailing edges thereof and to entrain and control the flow of said other air that moves over said upper surface; and
    wherein at least a portion of said second device is arranged in said wing component aft of said first device in the direction of flow of the air stream.

14. Th aircraft defined in claim 13, Where in the fan blades are elongate and extend outward substantially perpendicular to the shaft to which said fan blades are attached.

15. The aircraft defined in claim 13, further comprising a shroud in each wing component adjacent to and above said fan blades, which extends substantially parallel to the upper surface of said wing and constricts air that is moved by said fan blades to flow in a direction substantially parallel to said upper surface of said wing, thereby to increase the speed of airflow over said upper surface and enhance the vertical lift of said aircraft wing.

16. The aircraft defined in claim 15, wherein the shroud is configured to taper in the direction of the upper surface of the respective wing to form a nozzle for increasing the speed of air passing over the upper surface.

17. The aircraft defined in claim 13, wherein said airflow surface adjacent at least some of said openings is a Coanda surface.

18. The aircraft defined in claim 1, wherein said airflow surface adjacent at least some of said openings is a Coanda surface.

* * * * *